US007567745B2

(12) United States Patent
Hersoug et al.

(10) Patent No.: US 7,567,745 B2
(45) Date of Patent: Jul. 28, 2009

(54) OPTICAL ATTENUATOR AND METHOD OF MANUFACTURE

(75) Inventors: Ellef Hersoug, Stockholm (SE); Tomas Adeback, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 708 days.

(21) Appl. No.: 10/544,256

(22) PCT Filed: Feb. 14, 2002

(86) PCT No.: PCT/SE02/00264

§ 371 (c)(1),
(2), (4) Date: Jan. 5, 2006

(87) PCT Pub. No.: WO02/065176

PCT Pub. Date: Aug. 22, 2002

(65) Prior Publication Data

US 2006/0133760 A1 Jun. 22, 2006

(30) Foreign Application Priority Data

Feb. 14, 2001 (SE) .................................. 0100488

(51) Int. Cl.
*G02B 6/00* (2006.01)
*G02B 6/255* (2006.01)
(52) U.S. Cl. ............................. 385/140; 385/96; 385/97
(58) Field of Classification Search ........................ None
See application file for complete search history.

(56) References Cited

U.S. PATENT DOCUMENTS 4,557,556 A * 12/1985 Decker, Jr. ................... 385/140
4,557,557 A * 12/1985 Gleason et al. .............. 385/140
5,588,087 A * 12/1996 Emmons et al. ............. 385/140
5,638,476 A    6/1997 Zheng
5,897,803 A    4/1999 Zheng et al.
6,464,410 B1 * 10/2002 Sahinci et al. ................. 385/98

FOREIGN PATENT DOCUMENTS

EP   0 594 996 A2   5/1994
EP   0 690 318 A1   1/1996
WO   95/24665 A1   9/1995

OTHER PUBLICATIONS

English translation of the Japanese office mailed Jun. 12, 2007 in corresponding Japanese application 2002-564635.

* cited by examiner

*Primary Examiner*—Omar Rojas
(74) *Attorney, Agent, or Firm*—Nixon & Vanderhye, P.C.

(57) ABSTRACT

In the manufacture of an optical attenuator having a desired value of the optical loss end regions of two optical fibers are placed with an offset in the traverse direction in relation to each other and having their end surface at each other. Thereafter the region at end surfaces is heated to make the ends melt to each other and the heating is then further continued. To achieve the desired loss in the finished attenuating splice the further heating is stopped for an optical loss exceeding the desired loss by a calculated value. This value can be obtained from measurements in real time of the loss for the splice during the continued heating. The measurements can be made at the beginning and end of an interrupt of the further heating. An attenuator manufactured in this way obtains an attenuation that accurately agrees with the desired value.

13 Claims, 3 Drawing Sheets

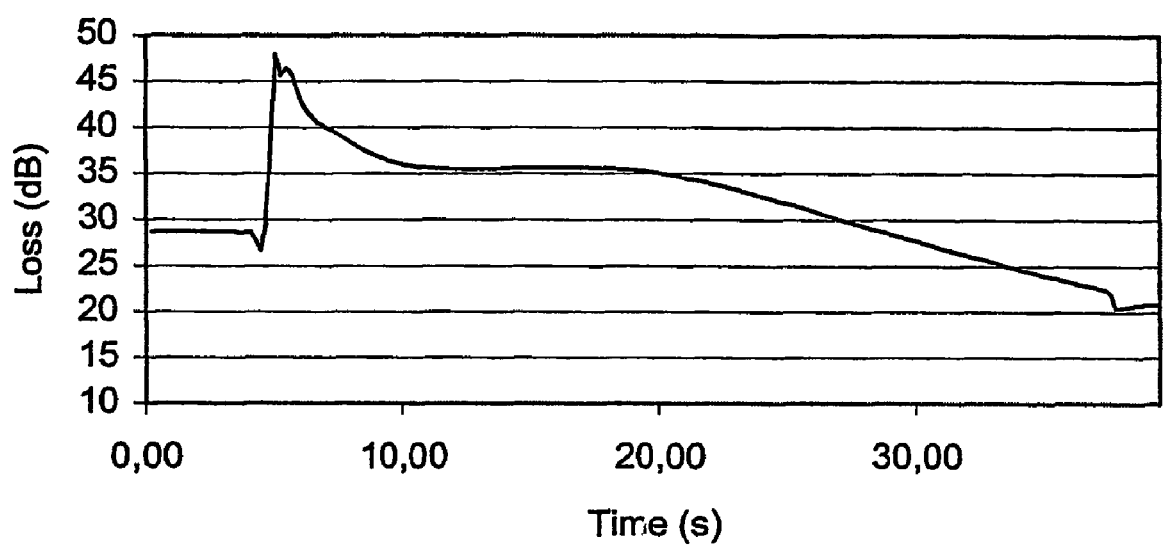
Fig. 2 Real time measurement of loss
Manual splice with FSU 925
Gap=50μm
Overlap=4μm
Current1 10mA, 0.3s
Current2 10mA, 30s
Current3 10mA 30s

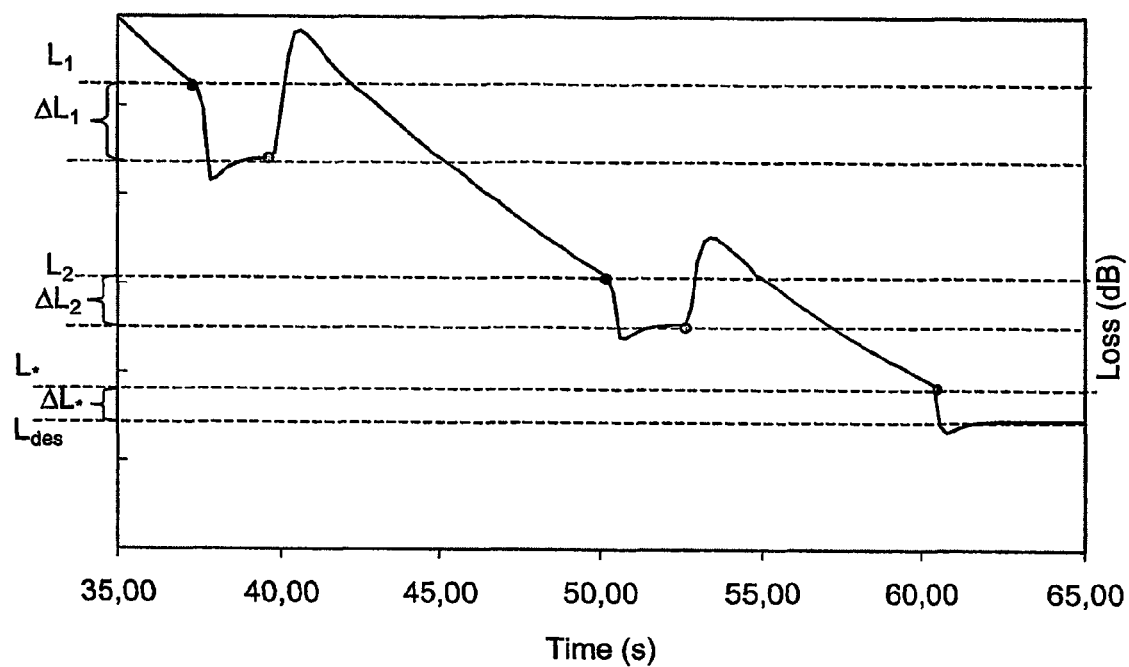
Fig. 3 Real time measurement of loss

OPTICAL ATTENUATOR AND METHOD OF MANUFACTURE

This application is the U.S. National phase of international application PCT/SEO2/00264 filed 14 Feb. 2002 which designates the U.S.

TECHNICAL FIELD

The present invention relates to a method of manufacturing attenuating elements from optical fibers and a device for manufacturing such attenuating elements.

BACKGROUND OF THE INVENTION

Optical attenuating elements can be manufactured by welding two optical fibers to each other with a lateral offset of the fibers, i.e. a splice having an intentionally produced lacking alignment of the cores of the fibers is manufactured and thus having a large loss. Then a welding device of the automatic type having a modified control program can be used. The control of the welding process can be performed in real time. The electronic processor of the welding device cans, for example, in real time get information from a power meter measuring the power of light coming from a light source and propagating through the splice during the welding process, and use the information to control the electric arc. The method comprises first selecting a desired lost. Then a splice having an offset is made. During the heating in the splicing process a current loss is essentially continually read. The molten glass material in the fibers has a surface tension reducing the offset and the loss gradually falls during the heating. When the loss has decreased to the desired loss the electric arc is stopped and thereby the heating is stopped.

This method is for example described in the published International Patent Application No. WO 95/24665 corresponding to U.S. Pat. No. 5,638,476, in U.S. Pat. No. 5,897, 803 and in the published European Patent Application No. 0594996.

It appears that several problems exist in this method. The main problem is however that the splice loss in the resulting splice does not become correct when using the method. It is thus a basic problem that the loss determined in the splice during the welding process according to the method differs from the loss that is measured directly after finishing the welding process. Most often the loss is lower after the end. The difference is about 0.5-2 dB for losses of about 3-15 dB for a reference point of about 200 μW, i.e. an input light power of approximately this value.

This effect could be explained by the fact that more light hits the detector which has a broad spectral responsiveness due to the fact that the fiber glows or that light from the electric arc is transmitted in the fiber. However, from tests when the light source is inactivated it has been possible to find that the light emitted by the fibers and the electric arc contributes very little. The power is in the magnitude of order of nW which corresponds to a very small part of a measured difference of 0.5-2 dB in the case where the reference point is about 200 μW.

The explanation of the difference is more probably associated with the fact that the optical character of the splice is changed due to the large heat differences that exist. E.g., the refractive index could be changed, this resulting in changed conditions for total reflection or in changes of the mode field diameters on which the loss depends. The steps could also be thought of as being caused by a difference in lateral offset between the fibers depending on whether the splice is hot or cold.

SUMMARY

It is an object of the invention to provide a method for manufacturing optical attenuating elements having an optical attenuation or loss closely agreeing with a predetermined or desired value.

It is another object of the invention to provide a device for welding two optical fibers to each other for manufacturing an optical attenuating element having an attenuation closely agreeing with a desired value.

Generally thus, an optical attenuator is manufactured from optical fibers. In the conventional way end regions of two optical fibers are placed to have an offset in the transverse direction in relation to each other and having their end surfaces located at each other. Thereafter the region at the end surfaces is heated to bring the ends to melt to each other and the heating is then further continued. The heating is stopped and finally the melted and heated region is allowed to cool. To achieve a desired value of the loss in the finished attenuating splice the further heating is stopped for an optical loss exceeding by a calculated value the desired loss. This value is obtained from measurements of the loss for this splice made in real time during the continued heating or made for a previously made splice between identical fibers having the same initial offset. In particular, at least one and preferably two temporary interrupts can be made during and of the further heating and the loss be measured at the start of and at the end of such an interrupt. These loss values are used in the calculation of the value of the loss when the heating will be definitely stopped.

A value of the loss is thus determined which the splice or the welding will obtain in the continued heating and for which the heating will be totally stopped. The heating is stopped at a time somewhat before achieving the desired loss in the hot splice. When the splice then is allowed to cool the manufacturing procedure of the attenuator is finished and then the splice obtains an optical loss closely agreeing with the desired one.

The advantage of manufacturing attenuators using this type of real time control of the welding arc is among other things that a model requiring knowledge of e.g. the lateral offset and the mode field diameters of the fibers does not have to be used since information of the loss is directly available.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 2 is a diagram of loss as a function of time when manufacturing an optical attenuator according to prior art for a welded splice having an initial offset and prolonged heating, and FIG. 3 is a diagram similar to FIG. 2 when manufacturing an optical attenuator using basically the same method as in FIG. 3 but including two interrupts during the prolonged heating.

PREFERRED EMBODIMENT

Figure 1:
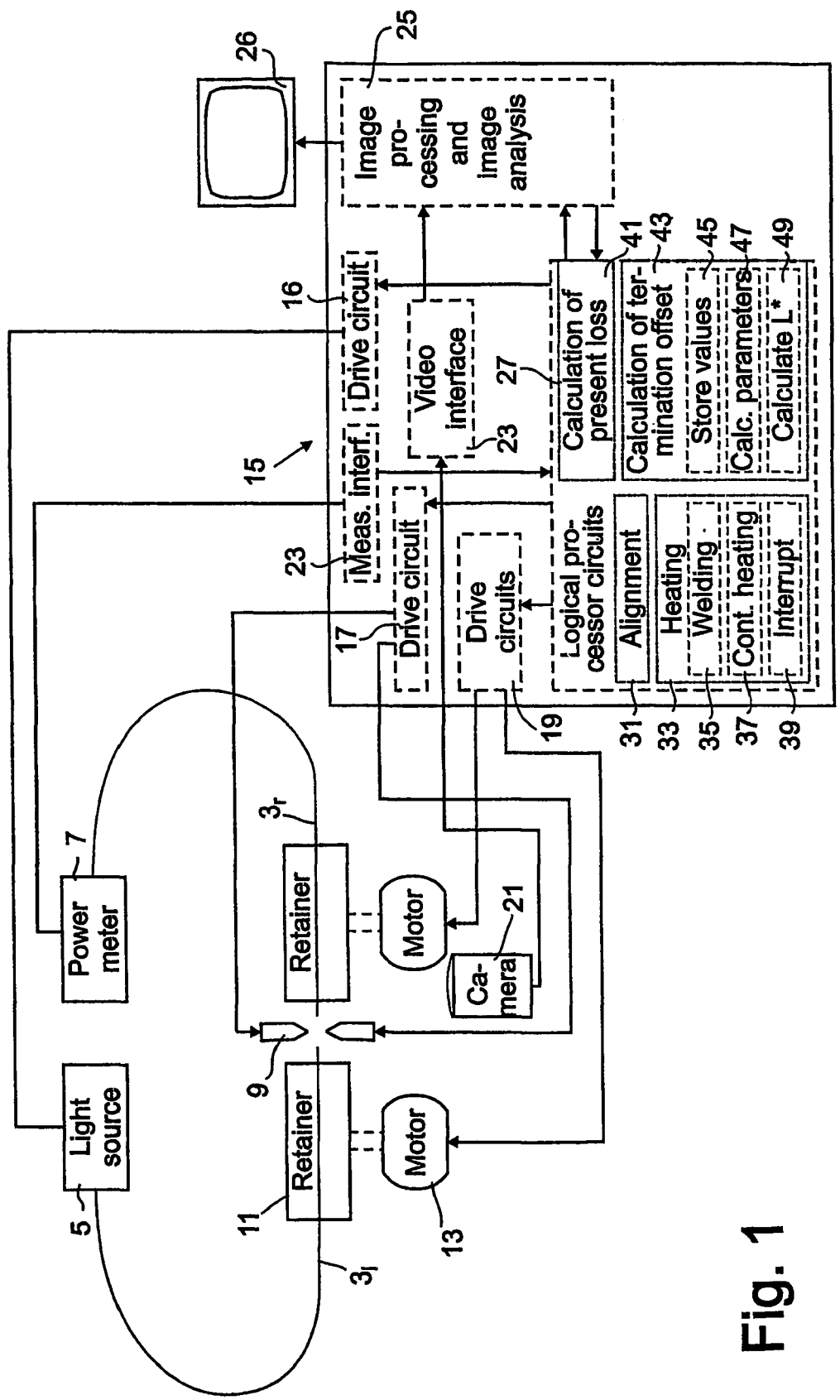
FIG. 1 is a schematic picture of an automatic device for welding optical fibers to each other.

FIG. 1 shows a fiber welding device 1 for welding two fibers $3_l$, $3_r$ to each other with a simultaneous measurement of the transmission through the weld. The left fiber $3_l$ is at its remote end connected to a light source 5 issuing light into the fiber. The right fiber $3_r$ is at its remote end connected to a light detector in the shape of a power meter 7.

The fibers $3_l$, $3_r$ have their end regions located between the points of electrodes 9 between which an electric discharge is produced for heating the ends of the fibers, the intensity of the electric discharge being determined by the electric current between the electrodes 9. The fibers are retained by retainers 11 which are movable in three orthogonal coordinate directions, both in a direction parallel to the longitudinal direction of the fibers and in two directions perpendicular to this direction. The retainers 11 are thus operated to move along suitable mechanical guides, not shown, by control motors 13. Electrical cables to the light source 5, the electrodes 9 and the motors 13 extend from an electronic circuit module 15 and from driver circuits 16, 17 and 19 therein. The power meter 7 is connected to a measurement interface 20 in the circuit module 15. A video camera 21 can continuously take pictures of the welding position, i.e. the region where the fibers $3_l$ and $3_r$ meet each other. It is through an electrical line connected to a video interface 23 in the electronic circuit module 15, from which a suitable image signal is provided to an image processing and image analyzing unit 25. Pictures of the welding position which advantageously include pictures simultaneously taken in two direction perpendicular to each other can be displayed on a display 26 connected to the unit 25.

The different steps in the heating and welding process are controlled by a control circuit 27, e.g. in the form of a suitable microprocessor or computer or a combination of processor and computer that are also connected to the image processing and image analyzing unit 25. The control circuit 27 provides signals for performing the different steps the welding process and is connected to the electrodes, the motors and the camera through respective drive circuits/interfaces. It thus controls the movement of the fiber ends in relation to each other by activating the motors 13 in suitable displacement directions and provides signals to the image processing and image analyzing unit 25 to start an analysis of taken pictures. Furthermore the control circuit 25 controls the time when a heating or welding is to start, by providing the electrodes 9 with a suitable electric voltage, and controls the time period during which this voltage is to be applied. The control circuit also gives a signal to the light source to activate it to emit light into the fiber $3_l$. It receives information of measured power values from the power meter 7.

By arranging the closely located end regions of the fibers $3_l$, $3_r$ held by the retainers 11 with a predetermined initial offset between their longitudinal axes or between the cores of the fibers and thereafter perform a controlled welding with a following prolonged heating a fiber-optical attenuator can be manufactured, compare the patent application Ser. No. WO 95/24665 corresponding to U.S. Pat. Nos. 5,638,476 and 5,897,803 and the European Patent Application No. 0594996 cited above.

The values obtained from the power meter 7 of the received light power can be easily recalculated to an optical loss in the splice between the fibers $3_l$, $3_r$ provided that the light power injected from the light source 5 in the fiber $3_l$ is known. During all of the following prolonged heating process after the very welding step the optical loss can thus be determined. In the diagram of FIG. 2 thus the measured loss in a splice having an initial offset between cores/claddings as a function of time during a prolonged welding period with constant electrical current in the electric arc is shown. The light arc between the electrodes 9 has been shut off when the value read by the power meter 7 for the first time becomes lower than 22.5 dB. In the diagram is clearly seen how the loss is after the shutting off rapidly decreased by about 2 dB.

In tests several interrupts have been made when heating a splice having an initial offset with the same current intensity in the electric arc, see the diagram of FIG. 3 that shows basically the same heating procedure as the diagram of FIG. 2 but with two extra interrupts of the electric arc. The same current intensity has been used during all the periods when the electric arc is activated after the initial welding of the fiber ends to each other. It appears that the "hops" or "steps" in the graph depends on the present optical loss in the splice, i.e. the loss existing exactly when the electric arc is stopped.

The value of the offset during the prolonged heating decreases exponentially with time provided that viscosity, surface tension and fiber diameters are constant, see the patent applications/patents cited above and references to other documents given therein. This is probably even more true if the temperature or the current also is constant. According to the butt-joint theory which is a good model if the lateral offset is large, the loss in dB is a quadratic function of the offset and then also the loss should decrease exponentially with time. The magnitude of the steps could therefore also be exponentially decreasing with the heating time. However, the conditions during the heating time depends on the welding current used, the state of the electrodes, etc. and are often not very repeatable.

Therefore it is better to consider the instantaneous loss in the splice during the prolonged heating process and to assume that the magnitude of the steps is a function of this loss or equivalently of the attenuation or transmission of the splice. It appears that in many cases a linear model that presupposes that the magnitude of the steps is linearly dependent on, such as proportional to, the instantaneous loss in the splice, can be used with a good accuracy. Such a model could in principle possibly be considered as equivalent with an exponential dependence on time.

The linear model is generally given by the formula, compare FIG. 3:

$$\Delta L = kL + m \qquad (1)$$

where $\Delta L$ is the magnitude of the step or hop, L is the loss at the start of the step and k and m are constants. They can be determined from experimentally determined measured values. For the determination measurements for a number of interrupts equal to the number of constants or parameters in the model, i.e. in this case two interrupts, are required. For the case shown in FIG. 3 the magnitude of the step $\Delta L1$ for the loss L1 and of the step $\Delta L2$ for the loss L2 can be measured from which values of k and m are calculated.

In the linear model according to the discussion above two constants, k and m are used which need to be determined. However, if either one of the constants k and m in can be assumed to have a value known in advance, only a determination of the other constant is required. A determination of only one constant requires only a measurement of the loss at a single interrupt. Also other models can be conceived that use a suitably selected group of functions from which a specially selected function is selected by measurements at one or more interrupts in real time. Such a group of functions could comprise suitably selected exponential functions.

The value L* of the loss measured in real time for which the electric arc is to be stopped in order that the final result will be the desired loss $L_{des}$ can for the linear model according to the description above be calculated from:

$$L^* + \Delta L^* = L_{des} \quad (2)$$

where ΔL* is the magnitude of the step obtained when the heating is interrupted for the loss L*. From (1) and (2) is obtained $$L^* = (L_{des} - m)/(1 + k)$$

The small circles in the diagram of FIG. 3 represent the times at which the electric arc has been shut off and has been started respectively. The time during which the electric arc is shut off should have a length of 1.5 to 3.0 s in order that the splice loss will have time to adopt a stable value.

Summarizing thus, by in the same way as in determining the diagram of FIG. 3 interrupting the electric arc twice before achieving the desired loss, the constants k and m in the linear model can be determined and therefrom L*. It can be made in real time to manufacture an attenuator having a desired attenuation so that when L* is achieved the electric arc is finally stopped.

A plurality of tests has been made and the set values and the obtained losses appear from Table 1. In Table 1, current2 is the value of the current intensity that is used during the welding operation and that is also used during the prolonged heating for obtaining the desired loss in the splice in several cases, this being indicated by the fact that current3 equals zero. In other cases a lower current intensity is used after the very splicing operation during the prolonged heating for obtaining the desired loss in the splice, this current velocity being indicated by current3 when this quantity is different from zero. The initial offset can be set so that it gives approximately twice the loss compared to the desired one, i.e. approximately equal to $2\Delta L_{des}$. Table 1 demonstrates that in many cases finished attenuators are obtained having attenuation values very close to the desired values.

Table 1: Experimental results

TABLE 1

| Experimental results | | | | | | | |
|---|---|---|---|---|---|---|---|
| Current 2 | | Current 3 | | Approx. | Alignment | Desired Loss | Result | Relative error |
| mA | S | mA | S | time(s) | (dB) | (dB) | (dB) | (%) |
| 12 | 0.6 | 10 | 90 | 43 | 35 | 15 | 15.21 | 1.4 |
| 10 | 0.6 | 10 | 90 | 60 | 35 | 15 | 15.01 | 0.07 |
| 11 | 80 | 0 | 0 | 32 | 35 | 15 | 15.00 | 0 |
| 11 | 80 | 0 | 0 | 32 | 35 | 15 | 14.82 | 1.2 |
| 11 | 80 | 0 | 0 | 28 | 35 | 15 | 14.90 | 0.7 |
| 11 | 80 | 0 | 0 | 28 | 35 | 15 | 14.88 | 0.8 |
| 10 | 0.6 | 11 | 90 | 25 | 35 | 15 | 14.82 | 1.2 |
| 10 | 80 | 0 | 0 | 56 | 35 | 15 | 14.99 | 0.07 |
| 10 | 80 | 0 | 0 | 51 | 22 | 10 | 9.99 | 0.1 |
| 10 | 80 | 0 | 0 | 56 | 14 | 5 | 4.98 | 0.4 |
| 10 | 0.6 | 11 | 80 | 30 | 14 | 5 | 4.92 | 1.6 |
| 10 | 0.6 | 11 | 80 | 28 | 13 | 4 | 4.00 | 0 |
| 10 | 0.6 | 11 | 80 | 27 | 9 | 3 | 2.94 | 2 |
| 10 | 0.6 | 11 | 80 | 25 | 5.5 | 2 | 1.98 | 1 |
| 10 | 0.6 | 11 | 80 | 29 | 4.5 | 1 | 0.99 | 1 |
| 10 | 0.6 | 11 | 80 | 28 | 2.0 | 0.5 | 0.47 | 6 |

In the method performed in real time the following steps are executed:

1. Place the end surfaces of the fibers quite at each other having the longitudinal directions of the fibers parallel to each other.
2. Align the fibers in the transverse direction with a lateral or transverse offset which, if the fibers were welded to each other for this offset, would give a loss that is much larger than the desired one, for example substantially equal to twice the desired one, i.e. $2 \cdot L_{des}$.
3. Bring in the longitudinal direction the end surfaces of the fibers against each other using some so called overlap, i.e. so that the fiber ends are somewhat pressed against each other.
4. Start the electric arc using a large welding current and finish the welding in a short period of time.
5. Reduce, if desired, the current intensity through the electric arc to a lower constant value and measure the loss in the splice essentially continuously.
6. Stop and start the electric arc at least once and preferably twice. Each interrupt must have a sufficient length to allow that the attenuation at the end of the interrupt will have reached a constant value, i.e. so that the welding position has had time to sufficiently cool. Record the values of the loss at beginning and end of each interrupt. A first interrupt can be made when the loss for example has decreased to a value exceeding the desired loss by about 70-80% such as about 70%, i.e. approximately for the loss of $1.7 \cdot L_{des}$. From the measurements of loss directly before and after this interrupt $\Delta L_1$ is calculated. If a further interrupt will be made, it can be made when the loss in the splice is approximately measured to be twice this value, i.e. for the loss of $L_{des} + 2\Delta L_1$. From the measured values of loss the loss L* is calculated for which the continued heating obtained by the electric arc will be stopped.
7. Stop the electric arc when the loss L* is obtained.
8. Allow the fibers welded to each other to cool.

To control these steps the processor 27 contains various modules. A module 31 handles positioning the fiber ends and therefor receives information from the unit 25 and produces signals to be transferred to the setting motors 13. Another module 33 controls the current through the electrodes and includes submodules 35-39 for determining electrical current for welding, of current for the continued heating and of times for interrupts during the continued heating respectively. A third module 41 calculated the present loss in the splice departing from the signal from the power meter 7. A fourth module 43 uses the calculated loss values and includes submodules 45-49 in which at least some of the calculated loss values are stored, the parameters k and l are calculated and the stop value L* of the loss is calculated.

If the initial alignment of the fibers is accurately determined, the determination of L* can be made for a first fiber splice and attenuating element after which the same value of L* is used for a series of attenuators manufactured from fibers of the same type having the same initial offset. However, the same good accuracy of the loss of the manufactured attenuating elements cannot always be obtained because the heating conditions in splicing operations are not repeatable. In the preferred method including real time measurements and real time control these conditions have no influence since a determination of L* is made for each splice dependent on measurements during the prolonged heating period.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A method of manufacturing an optical attenuator from optical fibers comprising:
   placing end regions of two optical fibers with a lateral or transverse offset and with end surfaces thereof essentially against each other;
   heating the end regions to make the end surfaces melt to each other;
   stopping the heating when an optical loss exceeding a desired optical loss by a value is obtained, the value depending on said optical loss at which the heating is stopped, the value being calculated from a linear function including two constants derived from measurements of the loss for this splice or for a splice between identical fibers having the same initial offset; and
   making said measurements by temporarily interrupting the heating during at least two time periods before the heating is stopped and by measuring the loss at the beginning of and at the end of the at least two time periods.

2. The method of claim 1, wherein each of the at least two time periods is selected to have a length for permitting the loss at the end of the respective time period to reach a constant value.

3. The method of claim 1, wherein a first of the at least two time periods is selected to start when the loss has decreased to a value exceeding the desired loss by 70-80%.

4. The method of claim 1, wherein a first of the at least two time periods is selected to start when the loss has decreased to a value exceeding the desired loss by substantially 70%.

5. The method of claim 1, wherein a second of the at least two time periods is selected to start at a time derived from the measurements of loss at the beginning of and at the end of a first of the at least two time periods.

6. The method of claim 5, wherein from the measurements of loss at the beginning of and at the end of the first of the at least two time periods, the loss difference $\Delta L_1$ is calculated, and starting the second of the at least two time periods when the loss in the splice has decreased to a value exceeding the desired loss by approximately twice said calculated loss difference.

7. A device for manufacturing an optical attenuator having a desired optical loss from optical fibers comprising:
   retainer and alignment units for retaining and moving two end regions of two respective optical fibers;
   a heater for heating end surfaces of the two fibers in the respective end regions;
   a loss detector for measuring optical loss for light propagating from one of the end regions to the other end region; and
   a controller connected to the retainer and alignment units, to the heater, and the loss detector, the controller arranged
      to control the retainer and alignment units to place the end regions with a lateral or transverse offset and with the end surfaces thereof essentially against each other, and thereafter
      to control a heating process performed by the heater wherein, after the end regions of the fibers at the end surfaces have melted to each other, the controller stops heating by the heater when an optical loss exceeding a desired optical loss by a value is obtained, the value depending on said optical loss at which the heating is stopped, the value being calculated by the controller from a linear function including two constants derived from measurements of the loss for this splice or for a splice between identical fibers having the same initial offset, and wherein the controller makes said measurements by temporarily interrupting the heating during at least two time periods before the heating is stopped and by measuring the loss at the beginning of and at the end of the at least two time periods.

8. The device of claim 7, wherein the controller is arranged to select each of the at least two time periods to have a length that permits the loss at the end of the respective time period to reach a constant value.

9. The device of claim 7, wherein the controller is arranged to select a first of the at least two time periods to start when the loss has decreased to a value exceeding the desired loss by 70-80%.

10. The device of claim 7, wherein the controller is arranged to select a first of the at least two time periods to start when the loss has decreased to a value exceeding the desired loss by substantially 70%.

11. The device of claim 7, wherein the controller is arranged to select a second of the at least two time periods to start at a time derived from the measurements of loss at the beginning of and at the end of a first of the at least two time periods.

12. The device of claim 11, wherein the controller is arranged to calculate, from the measurements of loss at the beginning of and at the end of the first of the at least two time periods, a loss difference $\Delta L_1$, and to start the second of the at least two time periods when the loss in the splice has decreased to a value exceeding the desired loss by approximately twice said calculated loss difference.

13. The device of claim 7,
   wherein the controller comprises:
      a constant calculation unit for calculating constants of a linear function; and
      a value calculation unit connected to the loss detector and the constant calculation unit to calculate a value of the linear function for a measured loss; and
   wherein the controller is arranged to control the heater to stop the heating when the optical loss measured by the loss detector exceeds the desired loss by the value, the value being calculated by the value calculation unit for said measured optical loss;
   wherein the controller, for determining the constants of the linear function, is arranged
      to control the heater to temporarily interrupt the continued heating, for said optical fibers or for identical optical fibers having the same initial offset, during the at least two time periods before the heating is finally stopped,
      to control the loss detector to measure the loss at the beginning of and at the end of the at least two time periods, and
      to control the constant calculation constant to calculate the constants from the measured losses at the beginning of and at the end of the at least two time periods.

* * * * *

UNITED STATES PATENT AND TRADEMARK OFFICE
CERTIFICATE OF CORRECTION

| | |
|---|---|
| PATENT NO. | : 7,567,745 B2 |
| APPLICATION NO. | : 10/544256 |
| DATED | : July 28, 2009 |
| INVENTOR(S) | : Hersoug et al. |

It is certified that error appears in the above-identified patent and that said Letters Patent is hereby corrected as shown below:

In Column 1, Line 22, delete "cans," and insert -- can, --, therefor.

In Column 6, Line 38, delete "therefor" and insert -- therefore --, therefor.

Signed and Sealed this

Twenty-second Day of December, 2009

David J. Kappos
*Director of the United States Patent and Trademark Office*